United States Patent
Winter et al.

(10) Patent No.: US 7,929,525 B2
(45) Date of Patent: Apr. 19, 2011

(54) SYSTEM AND METHOD FOR ADDING TRANSPORT LAYER TO UNCOMPRESSED VISUAL INFORMATION PACKETS

(75) Inventors: Robert Winter, Leander, TX (US); Bruce Montag, Austin, TX (US); Liam B. Quinn, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 341 days.

(21) Appl. No.: 11/769,803

(22) Filed: Jun. 28, 2007

(65) Prior Publication Data

US 2009/0003331 A1 Jan. 1, 2009

(51) Int. Cl.
*H04L 12/56* (2006.01)
(52) U.S. Cl. ........ 370/389; 370/468; 370/438; 370/522; 345/1.2; 345/204; 710/62
(58) Field of Classification Search ............ 370/438, 370/522; 386/46, 125; 345/1.2; 710/62
See application file for complete search history.

(56) References Cited

U.S. PATENT DOCUMENTS

| | | | |
|---|---|---|---|
| 6,223,283 B1 * | 4/2001 | Chaiken et al. | 713/1 |
| 6,892,298 B2 | 5/2005 | West | 713/2 |
| 6,931,198 B1 * | 8/2005 | Hamada et al. | 386/46 |
| 7,487,273 B2 * | 2/2009 | Kobayashi | 710/62 |
| 2005/0228995 A1 * | 10/2005 | Kwak et al. | 713/168 |
| 2006/0125832 A1 * | 6/2006 | Mawatari et al. | 345/501 |
| 2006/0209892 A1 * | 9/2006 | MacMullan et al. | 370/468 |
| 2007/0242062 A1 * | 10/2007 | Guo et al. | 345/204 |
| 2008/0068287 A1 * | 3/2008 | Day et al. | 345/1.2 |

* cited by examiner

*Primary Examiner* — Robert W Wilson
*Assistant Examiner* — Mohamed Kamara
(74) *Attorney, Agent, or Firm* — Hamilton & Terrile, LLP; Robert W. Holland

(57) ABSTRACT

DisplayPort micropackets of uncompressed visual information are adapted for communication across a network by stuffing packets with sink device identification information. For example, a packet stuffer adds selected portions of sink device EDID information to DisplayPort packets, such as EDID bytes 8 through 15, to a predetermined portion of the DisplayPort packets, such as between symbols FS and FE. Adding sink device identification information to each DisplayPort packet supports routing or switching of the packets to the identified sink device.

19 Claims, 3 Drawing Sheets

EDID 1.1 (128 Bytes)

Byte Sequence 00-07: Header Information
08-17: Complete Serial Number
08-09: Manufacturer ID
10-11: Product ID Code (little-endian)
12-15: Serial Number (little-endian)
16: Week of Manufacture
17: Year of Manufacture. Add 1990 to the value for the actual year.
18: EDID Version Number
19: EDID Revision Number

SYSTEM AND METHOD FOR ADDING TRANSPORT LAYER TO UNCOMPRESSED VISUAL INFORMATION PACKETS

BACKGROUND OF THE INVENTION

1. Field of the Invention

The present invention relates in general to the field of information handling system communication of visual information, and more particularly to a system and method for adding a transport layer to uncompressed visual information packets.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically interact with end users through a visual display. The increasingly powerful components used in information handling systems have allowed presentation of visual images with high resolutions that use large numbers of pixels disposed in a display. High resolution images typically require large amounts of information with pixel values frequently refreshed at a display. Generally, in order to generate high resolution images, information handling systems compress the visual information until the visual information is rendered as pixel values for communication to a display. For example, pictures or videos are stored in compressed form, such as JPEG and MPEG formats, and, often, much of the processing for creating the visual images is performed by specialized components located in a graphics card. By keeping visual information compressed until it is rendered by the graphics card into pixel values, less bandwidth is used within the information handling system for communicating the visual information between processing components, such as from memory to the CPU or the graphics card. The rendered visual information typically proceeds from the graphics card to the display using display-specific connections, such as VGA or DVI connections. These display-specific connections are designed to keep a steady flow of uncompressed pixel-level visual information from the graphics card to the display controller, which directs the display pixels to present colors determined from the uncompressed visual information.

Recently, to increase the flexibility available when communicating uncompressed visual information to a display, industry has introduced the DisplayPort specification to define a digital I/O interface for internal and external display platforms. The DisplayPort specification provides an asynchronous bi-directional mechanism to deliver uncompressed digital packetized video streams over a two pair wire interface with pixel data encapsulated into 64 byte micropacket transport units. The transport units contain data, control and synchronization for an end device, know as a sink, that receives video from a single transmitting source device. DisplayPort sink devices store EDID information that is communicated from the sink device to the source device. Although the DisplayPort digital packetized architecture implies an ability to steer packets to different locations, version 1.1 of the DisplayPort specification only provides for a direct link between a single source and sink pair of devices, such as through a direct cable connection. DisplayPort packets do not include a transport layer that identifies the target sink device to which the packets are intended to go.

SUMMARY OF THE INVENTION

Therefore a need has arisen for a system and method which includes transport information in uncompressed visual information packets for communication to a targeted sink device.

In accordance with the present invention, a system and method are provided which substantially reduce the disadvantages and problems associated with previous methods and systems for communication of uncompressed visual information packets to a targeted sink device. Identification information retrieved from the sink device is added to a predetermined portion of each uncompressed visual information packet. The uncompressed visual information packets are directed to the targeted sink device by reference to the unique identification information in each packet.

More specifically, a DisplayPort source retrieves EDID information from a DisplayPort sink and extracts a predetermined portion to create a unique identifier associated with the sink, such as EDID bytes 8 through 15. A packet stuffer associated with the DisplayPort source adds the unique identifier to each DisplayPort packet, such as by adding EDID bytes 8 through 15 between symbols FS and FE of each DisplayPort packet. The packets are sent to the targeted sink device by reference to the unique identifier, such as by routing or switching of the packets. In this manner, the DisplayPort source need not directly couple to a single sink device, but rather can send packets to distal locations through networks.

The present invention provides a number of important technical advantages. One example of an important technical advantage is that uncompressed visual information packets, such as DisplayPort packets, have transport information that allow communication to a targeted sink device. Visual information micropackets are altered by insertion of sink device identification information, such as with an EDID read, to support communication of uncompressed visual information to plural possible destinations. Placing sink device identification in the stuffing symbol section of a DisplayPort packet provides a defined area for a read of the identification information so that packets can be switched and routed appropriately. Insertion of the identification information in the stuffing section provides a non-destructive scheme for individually addressable DisplayPort transport packets with minimal alterations to the operation of sink and source devices.

BRIEF DESCRIPTION OF THE DRAWINGS

The present invention may be better understood, and its numerous objects, features and advantages made apparent to those skilled in the art by referencing the accompanying

DETAILED DESCRIPTION

Uncompressed visual information packets are adapted for communication between an information handling system and a display device through a network by adding sink device identification information to the packets. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
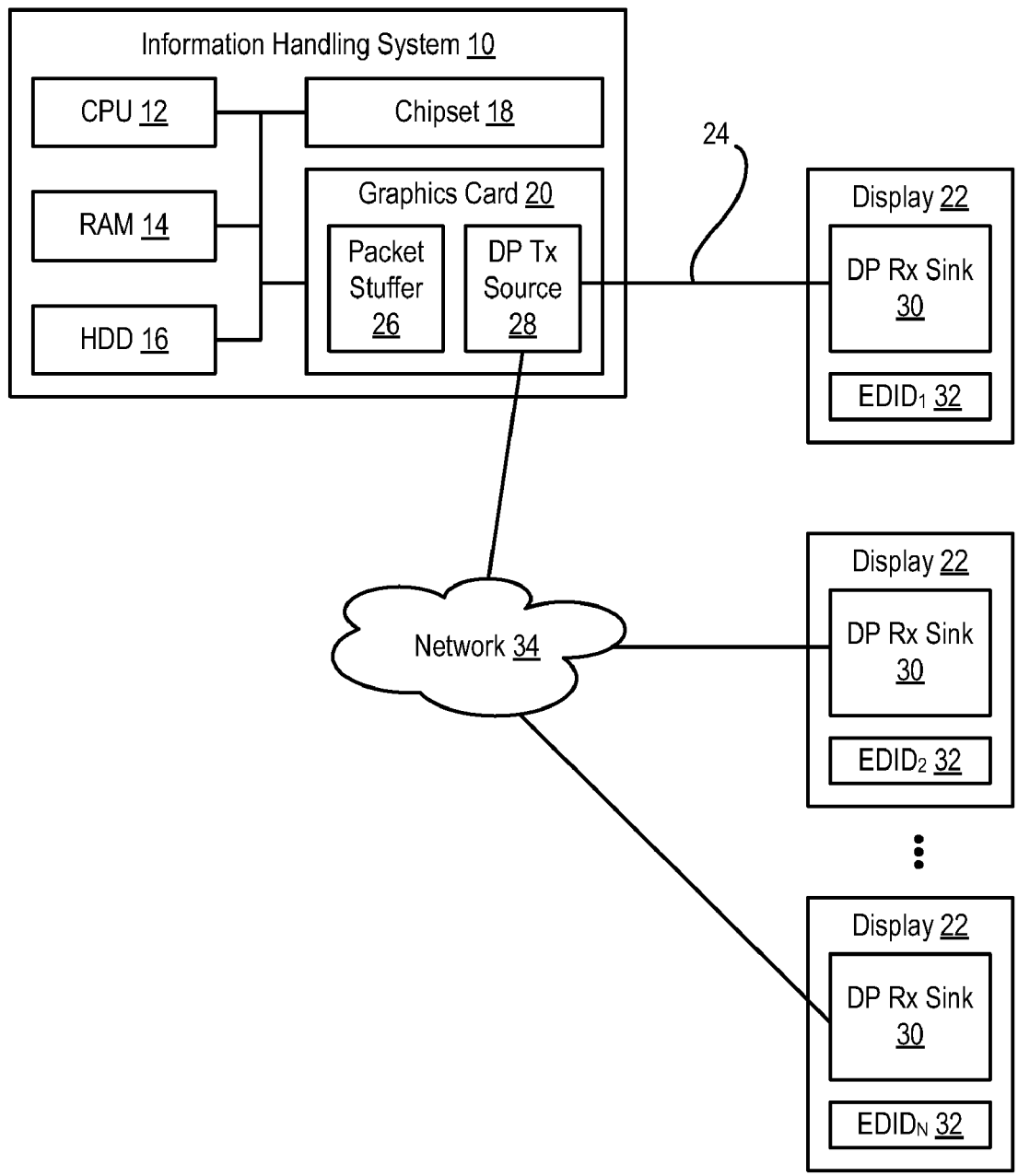
FIG. 1 depicts a block diagram of an information handling system having selected portions of a sink device EDID added to uncompressed visual information packets sent to the sink device.
Figure 2:
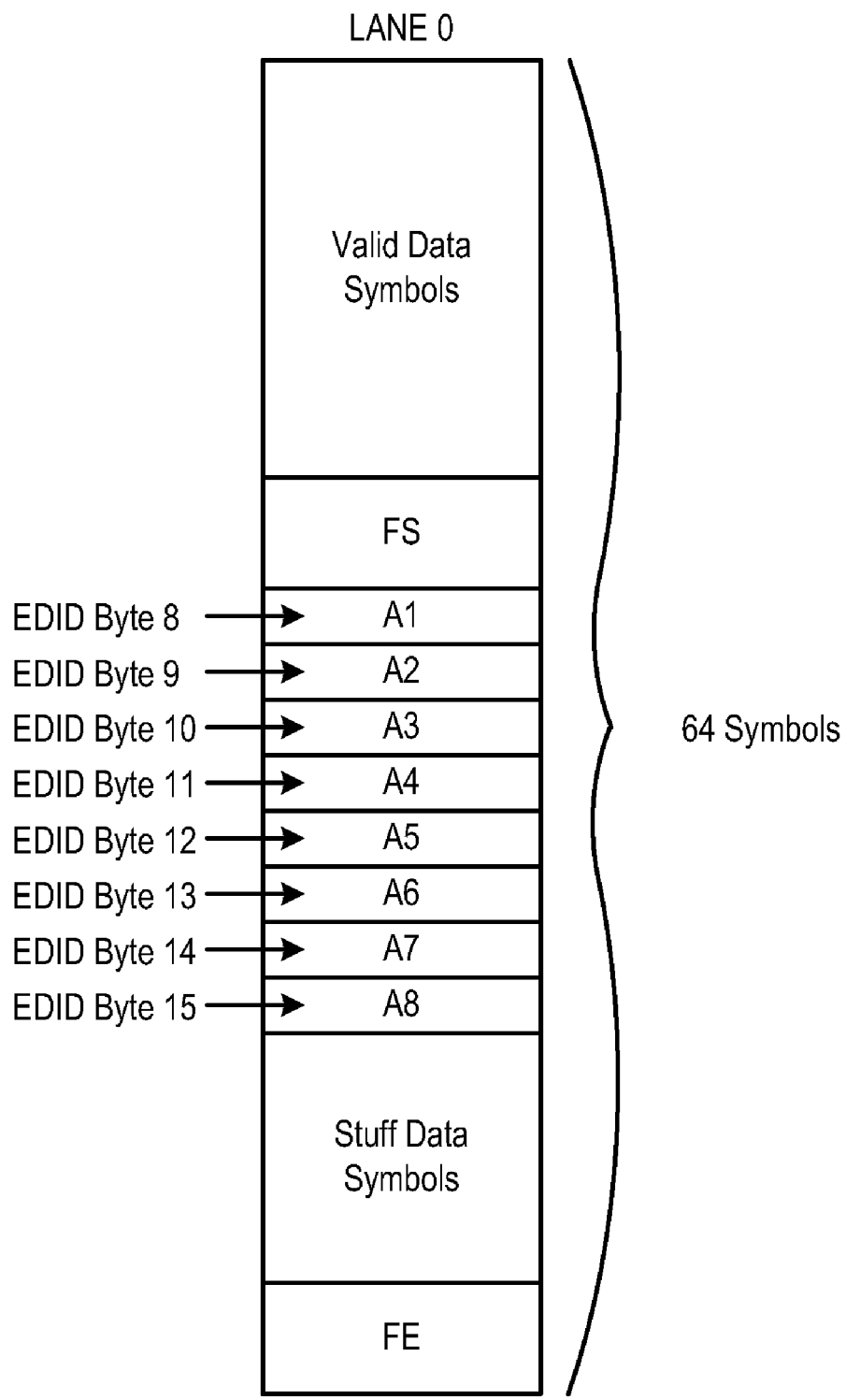
FIG. 2 depicts the symbols included in a DisplayPort packet.

Referring now to FIG. 1, a block diagram depicts an information handling system 10 having selected portions of a sink device EDID added to uncompressed visual information packets sent to the sink device. Information handling system 10 is built from plural processing components, such as a CPU 12, RAM 14, a hard disk drive 16, a chipset 18 and a DisplayPort graphics card 20, which cooperate to generate uncompressed visual information for presentation to an end user at a display device 22. DisplayPort graphics card 20 outputs visual information in micropackets and provides bi-directional control information as defined by the DisplayPort standard. The DisplayPort micropackets as described by the DisplayPort standard are directed to a display device though a direct connection with a DisplayPort cable 24, and thus lack network address information as output from an information handling system 10. FIG. 2 depicts the configuration of a DisplayPort packet as sent through a lane of a DisplayPort cable. The packet includes 64 symbols including a section for valid data symbols and a section for stuffing data symbols between symbol FS and FE.

Figures 3, 4:
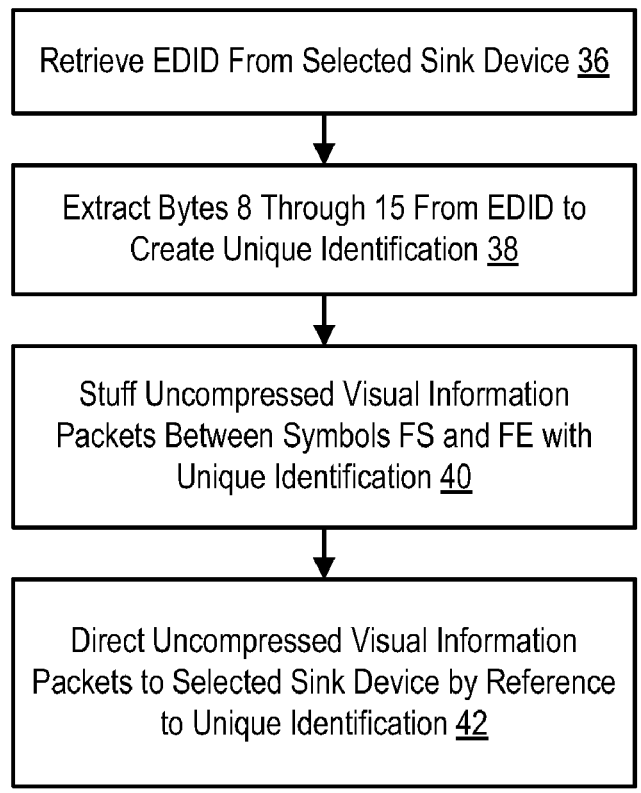
FIG. 3 depicts the bytes stored in EDID of a sink device.
FIG. 4 depicts a flow diagram of a process for adding sink device identification to DisplayPort uncompressed visual information packets.

In order to add a transport layer to the DisplayPort packets, a packet stuffer 26 associated with a DisplayPort source device 28 adds identification information to the stuffing section of each packet. Source device 28 obtains identification information by a query to the sink device 30 targeted to receive visual information. For example, source device 28 reads the EDID 32 stored on display 22 and extracts selected portions of the EDID for inclusion in each DisplayPort packet so that the packet has sufficient unique information in the stuffing section to identify the targeted sink device. FIG. 3 depicts the byte sequence defined by EDID version 1.1. Packet stuffer 26 extracts bytes 8 through 15 and adds bytes 8 through 15 to each DisplayPort packet so that each packet is uniquely associated with the targeted sink device. Since each packet includes information to uniquely identify the targeted sink device, the uncompressed visual information packets may be sent through a network 34 using routing or switching by reference to the unique identification information.

Referring now to FIG. 4, a flow diagram depicts a process for adding sink device identification to DisplayPort uncompressed visual information packets. The process begins at step 36 with retrieval of EDID information by a source device from a selected sink device, such as display capable of presenting information received in DisplayPort packets. At step 38, the source device extracts predetermined of the EDID information for use in identification of packets sent from the source device to the targeted sink device. For example, the source device extracts bytes 8 through 15 of the EDID information to create an identifier unique to the targeted sink device. At step 40, the unique identifier extracted from the EDID is stuffed into a predetermined section of each DisplayPort packet, such as between symbols FS and FE, so that each packet is uniquely associated with the targeted sink device. At step 42, the uncompressed visual information packets are directed to selected sink devices by reference to the unique identifier. The packets may be sent as stuffed or altered in a network by using the unique information to form network packets.

Although the present invention has been described in detail, it should be understood that various changes, substitutions and alterations can be made hereto without departing from the spirit and scope of the invention as defined by the appended claims.

What is claimed is:

1. An information handling system comprising:
   plural processing components configured to generate uncompressed visual information packets;
   a source device interfaced with the plural processing components to receive the uncompressed visual information packets and configured to communicate the uncompressed visual information packets to a sink device, the source device further configured to retrieve identification information from the sink device; and
   a packet stuffer associated with the source device, the packet stuffer configured to add a predetermined portion of the identification information to a predetermined position in each uncompressed visual information packet.

2. The information handling system of claim 1 wherein the identification information comprises extended display identification data (EDID) information stored at the sink device.

3. The information handling system of claim 2 wherein the predetermined portion of the identification information comprises extended display identification data (EDID) bytes 8 through 15.

4. The information handling system of claim 1 wherein the source device comprises a DisplayPort source device.

5. The information handling system of claim 4 wherein the predetermined position in each uncompressed visual information packet comprises a position between symbols Fill Start (FS) and Fill End (FE).

6. A method for communicating uncompressed visual information packets from an information handling system, the method comprising:

retrieving identification information from a selected sink device by a source device;

extracting a selected portion of the identification information; and adding the selected portion of the identification information to a predetermined position in each uncompressed visual information packet; and sending from the source device to the sink device the modified uncompressed visual information packet.

7. The method of claim 6 further comprising sending the uncompressed visual information through a network to the selected sink device by reference to the predetermined portion of the identification information of each packet.

8. The method of claim 7 wherein sending the uncompressed visual information through the network further comprises routing the uncompressed visual information by reference to the predetermined portion of the identification information of each packet.

9. The method of claim 7 wherein sending the uncompressed visual information through the network further comprises switching the uncompressed visual information by reference to the predetermined portion of the identification information of each packet.

10. The method of claim 7 wherein the identification information comprises extended display identification data (EDID) information stored at the sink device.

11. The method of claim 10 wherein the predetermined portion of the identification information comprises extended display identification data (EDID) bytes 8 through 15.

12. The method of claim 7 wherein the source device comprises a DisplayPort source device.

13. The method of claim 12 wherein the predetermined position in each uncompressed visual information packet comprises a position between symbols Fill Start (FS) and Fill End (FE).

14. A system for communicating uncompressed visual information packets from an information handling system, the system comprising:

a source device configured to send uncompressed visual information packets through a cable to a sink device; the source device further configured to retrieve identification information from the sink device; and a packet stuffer associated with the source device, the packet stuffer configured to add a predetermined portion of the identification information to a predetermined position in each uncompressed visual information packet.

15. The system of claim 14 wherein the identification information comprises extended display identification data (EDID) information stored at the sink device.

16. The system of claim 15 wherein the predetermined portion of the identification information comprises extended display identification data (EDID) bytes 8 through 15.

17. The system of claim 14 wherein the source device comprises a DisplayPort source device.

18. The method of claim 17 wherein the display device ports comprise DisplayPort ports.

19. The system of claim 4 wherein the predetermined position in each uncompressed visual information packet comprises a position between symbols Fill Start (FS) and Fill End (FE).

\* \* \* \* \*